United States Patent [19]

Burke, Jr.

[11] 3,912,381
[45] Oct. 14, 1975

[54] PHOTOGRAPHIC APPARATUS AND METHOD FOR LOCATING FILM IN A PRECISE FOCAL PLANE

[75] Inventor: Edward F. Burke, Jr., Reading, Mass.

[73] Assignee: Polaroid Corporation, Cambridge, Mass.

[22] Filed: Dec. 26, 1973

[21] Appl. No.: 428,379

[52] U.S. Cl. .............. 352/72; 352/78 R; 352/224
[51] Int. Cl.² ........................................ G03B 1/54
[58] Field of Search .......... 352/221, 222, 224, 227, 352/228, 229, 72, 78; 353/95

[56] References Cited
UNITED STATES PATENTS

| | | | |
|---|---|---|---|
| 1,933,783 | 11/1933 | Owittel | 352/228 |
| 1,953,986 | 4/1934 | Porter | 352/78 R |
| 1,994,586 | 3/1935 | Mihalyi | 352/72 |
| 2,535,334 | 12/1950 | Thevenaz | 352/224 |
| 2,587,123 | 2/1952 | Dunning et al. | 353/95 |
| 3,240,550 | 3/1966 | Mitchell et al. | 352/227 X |
| 3,434,783 | 3/1969 | Sakaki et al. | 352/72 |
| 3,488,120 | 1/1970 | Nagel | 352/221 X |
| 3,791,726 | 2/1974 | Miller | 352/224 |

Primary Examiner—Monroe H. Hayes
Assistant Examiner—Alan Mathews
Attorney, Agent, or Firm—David R. Thornton

[57] ABSTRACT

Photographic apparatus including an aperture plate adapted to cooperate with a pressure plate of a photographic film handling cassette to laterally bend a portion of photographic film adjoining an incremental section thereof and thereby force the incremental section into a planar configuration at the focal plane while supporting only the longitudinal margins of the film. Both the aperture plate and the pressure plate are longitudinally channeled and include complementary curves which bend the film strip laterally as it enters and leaves the focal plane so that the film section located longitudinally between the curves is stressed into a substantially flat configuration.

6 Claims, 4 Drawing Figures

PHOTOGRAPHIC APPARATUS AND METHOD FOR LOCATING FILM IN A PRECISE FOCAL PLANE

BACKGROUND OF THE INVENTION

1. Field of the Invention

This invention relates to photographic apparatus and, more particularly, to a method and an improved motionpicture apparatus for locating photographic film in a precise focal plane.

2. Description of the Prior Art

Recent important technological advances have made it possible to provide multipurpose motion-picture cassettes from which the film need not be removed during exposure, processing and projection operations. Exemplary of such new and unique systems are those described in prior U.S. Pat. No. 3,615,127 of Edwin H. Land issued Oct. 26, 1971; U.S. Pat. No. 3,537,784 of Rogers B. Downey issued Nov. 3, 1970; U.S. Pat. No. 3,608,455 of Rogers B. Downey issued Sept. 28, 1971; and U.S. Pat. No. 3,627,407 issued Dec. 14, 1971 of Gerald H. Cook.

In these systems, the cassette is first operated in a camera for exposure of the film strip and then subsequently loaded into a projector apparatus which first subjects the cassette to a sequence of operations including treating the film with a processing fluid so as to process the film strip to a viewable condition and then subsequently projects the developed, recorded images. During these processing operations, the film strip is advanced across both a processing station and an exposure-projection station of the cassette. Provision is made in the exposure-processing station to minimize contact with both the film emulsion layer and the fluid layer deposited thereon. This is accomplished by providing a longitudinal channel in the cassette pressure plate such that the latter only contacts the film margins of the emulsion side of the film strip.

To further minimize retarding forces on the film, particularly desirable in battery operated apparatus, the aperture plate of the camera is also preferably channeled such that when the cassette is operatively positioned in the camera, the film margins are loosely confined between juxtaposed portions of the aperture plate and the pressure plate.

In such an arrangement, while the margins of the film are adequately supported over the exposure aperture, variations may occur in the location of the centrally located image recording area of the film strip. Hence, it is desirable to provide an arrangement for positioning the image area of the film in a precise location while still minimizing drag forces on the film and contact with the emulsion surface.

Consequently, it is a primary object of this invention to provide improved apparatus for accomplishing photographic operations.

It is another primary object of this invention to provide an improved film handling cassette and photographic apparatus configured to facilitate positioning of the cassette retained film strip in a precise focal plane.

Still another object of this invention is to provide an improved method of efficiently positioning a photographic film in a precise focal plane without contact to the viewable portion of the emulsion.

SUMMARY OF THE INVENTION

The photographic system of the present invention includes means for loosely confining the margins of an incremental section of a film strip so as to position the centrally located portion thereof over an exposure or projection aperture and for laterally stressing the film portion adjoining the incremental section so as to locate the centrally located portion in a precise location without contact to the emulsion in the image recording area.

In the illustrated embodiment, the film strip is permanently retained within a film handling cassette which includes a pressure plate designed to support the film margins as the latter passes an exposure opening in the cassette wall. The camera structure carries a longitudinally channeled aperture plate designed to cooperate with the cassette pressure plate such that the film margins are loosely retained between both plates. Each of the plates carry complementary structure which extends slightly out of the general plane of the plates so as to force the film margins through a torturous path at the leading and trailing edges of the exposure or projection aperture so as to laterally bend or stress the film strip as it enters and leaves the aperture and thereby stress the incremental section of film located over the aperture into a planar configuration.

Preferably, the film margin supports of the aperture plate include raised protuberances while the margin supports of the cassette pressure plate include substantially mating indentations so that the film strip is bent out of and back into the plane of the margin supports just prior to and after the film passes across the exposure or projection aperture. This laterally bends or ripples the film before and after the aperture which tends to flatten the film segment between the ripples, or, that is, flattens the film over the aperture. Hence, over the aperture, the film is stressed into a flat configuration and held by the margin supports in the focal plane.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

DESCRIPTION OF THE PREFERRED EMBODIMENT

The illustrated embodiment of this invention employs a multipurpose film handling cassette of the type described in the commonly assigned copending patent application Ser. No. 227,092 of John F. Batter, Jr. et al, filed Feb. 17, 1972. Such a cassette is configured for use in a motion-picture system in which the several operations of exposure, chemical processing, drying and projection of the recorded images are accomplished without transferring the film from the cassette.

In the above system, the film strip stored within the cassette is first exposed in a camera to record scene images thereon. Then the cassette is loaded into a special purpose projector which first subjects the film strip to a processing treatment and thereafter dries the film strip and projects the recorded images for viewing by an audience.

Figure 1:
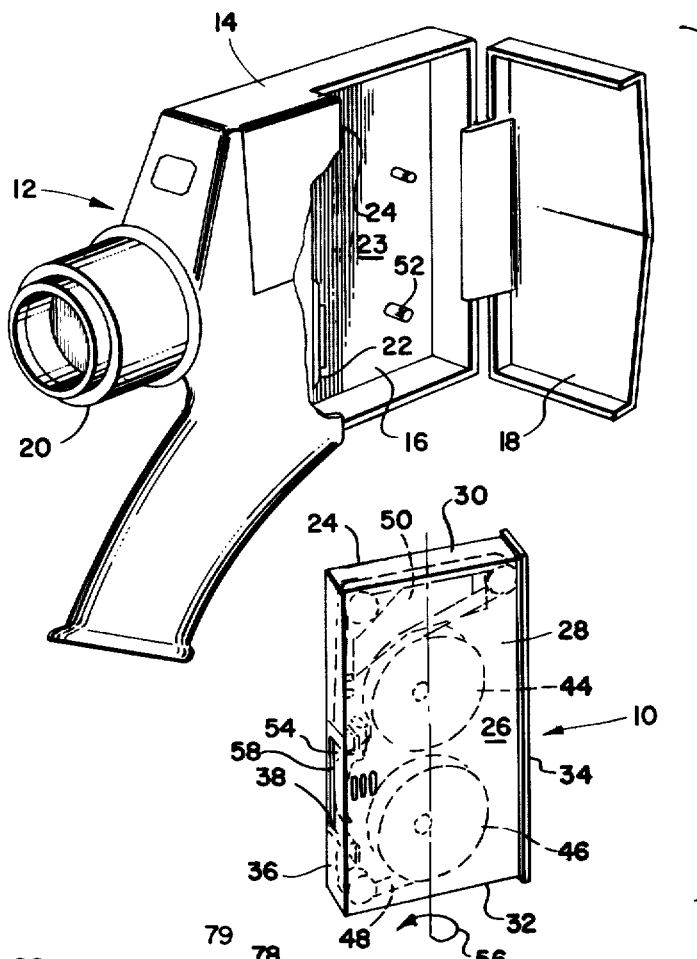
FIG. 1 is a diagrammatic view in perspective of a camera and a film handling cassette embodying the features of this invention.

In the illustrated embodiment of the invention, which may be best understood by first referring to FIG. 1 of the drawing, a multipurpose film handling cassette 10 of the above-noted type is shown in conjunction with a camera 12. Referring first to the camera, it can be seen from FIG. 1 that the camera 12 includes a body 14 having a cassette-receiving pocket 16 which is closed by a door member 18. Positioned within the leading edge of the pocket 16 in registration with a conventional taking lens assembly 20 is an aperture plate 22. As later explained in detail with regards to positioning of the cassette 10 within the camera body 14, the aperture plate 22 is positioned within a confined recess portion 23 of the cassette-receiving pocket 16 which is formed in part by an overlying edge portion 24 of the camera body 14.

Prior to completing the description of the camera, the cassette 10 will be more fully described. In this embodiment, the cassette 10 comprises a generally parallelepiped casing or housing 26 constituted by a pair of planar side walls 24 and 28 joined together at their edges by end walls 30, 32 and elongated edge walls 34 and 36. Carried within the edge wall 36 is an opening 38 which permits access of image carrying light rays to the cassette for exposure of the film and egress of image carrying light rays from the film for image projection as later explained in detail.

Internal components of the cassette 10, which are shown in FIG. 1 in dotted lines, include a supply spool or reel 44 and a take-up spool or reel 46 coplanarly mounted for rotation about parallel axes. A photographic film strip 48, of the type described in the aforementioned application Ser. No. 227,092, is mounted within the camera 12 with its opposite ends respectively connected to the film spools 44 and 46 such that in accordance with rotation of the latter, the film strip 48 may be progressively advanced within the cassette casing 28. Initially, the film strip 48 is, in its unexposed state, coiled primarily about the supply spool 44, and in its path from the supply spool 44 to the take-up spool 46, the film strip 38 passes through a processing station 50 and across the cassette opening 38.

The cassette opening 38 is utilized to permit image bearing light rays to impinge upon progressive incremental sections of the film strip 48 when the cassette 10 is operated in the camera 12. In this regard, the camera 12 includes a claw member (now shown) for stepwise advance of the film strip 48, and a spool drive member 52 is configured to cooperate with the take-up spool 46, to rotate the latter, so as to take up the film strip 48 as the incremental sections of the strip are progressively advanced across the cassette opening 38.

Following the exposure operations, the cassette is designed to be operated by other apparatus, not shown, to again advance the film strip, for example, from the take-up spool 46 back to the supply spool 44, while processing fluid, not shown, is deposited on the film by means of the processor station 50. Subsequently, the film is again advanced to the take-up spool 46 while light rays from an external source are directed through incremental sections of the film strip so as to provide viewable images. To facilitate these functions, the pressure plate 54 and a prismatic reflector element (not shown) are mounted behind the opening 38. Further, for projection purposes, another opening (not shown) is provided in the side 24 of the cassette for permitting entrance of light to the prism for transmission through the film strip 48. Hence, the opening 38 first operates as part of an exposure station and then as part of a projection station of the cassette 10.

As previously indicated, in this embodiment the cassette 10 is inserted within the cassette-receiving pocket 16 by placing the cassette edge wall 36 under the overhanging lip 24 of the pocket 16 and then rotation the cassette as shown by the arrow 56 while the cassette is slid forward towards the lens system 20 to bring the exposure opening 38 into cooperative relationship with the camera aperture plate 22. This seats the portion 58 (shown in FIG. 4) of the film 48 which is presented within the cassette opening 38 in proper relation to the aperture plate 22 as later explained in detail with regard to FIGS. 2 and 3.

Figure 2:
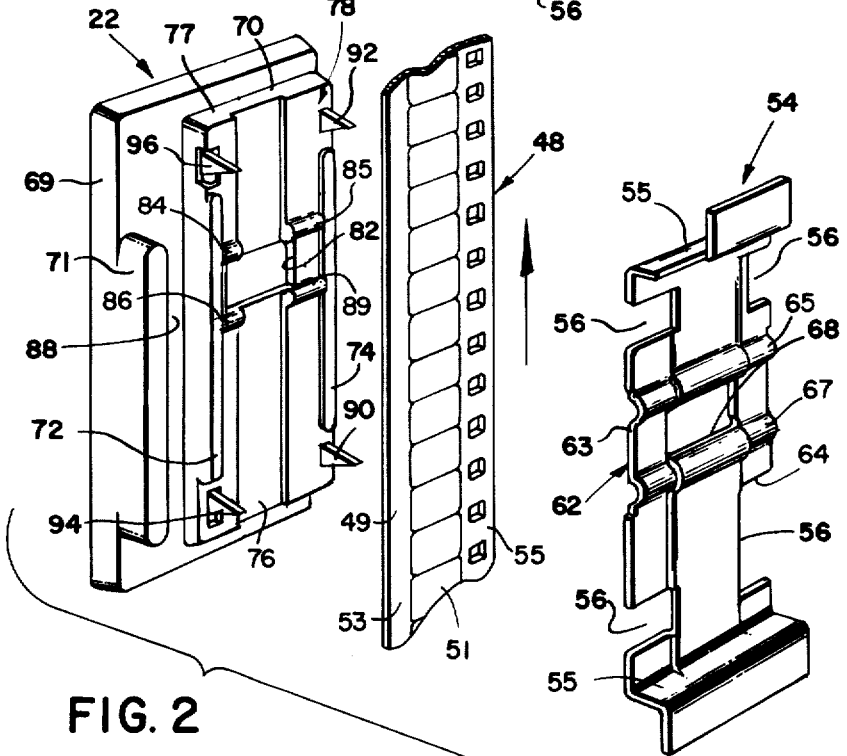
FIG. 2 is an exploded view in perspective illustrating the juxtaposed position of the camera aperture plate, the film, and the cassette pressure plate when the cassette shown in FIG. 1 is located in an operative location in the camera.

The film strip 48 extends within the cassette 10 from spool 44 to spool 46 such that the emulsion surface 49 (shown in FIG. 2) of the film strip is positioned inwardly, or, that is, toward the pressure plate 54. To prevent contact with usable portion 51 of the emulsion surface 49 intermediate the longitudinal margins 53 and 55 and provide clearance for the later deposited processing fluid (not shown), the pressure plate 54 includes a film reference surface 62 as shown in FIG. 2 which contacts only the film margins. This is carried out by a longitudinal channel 60, shown more clearly in FIG. 3, which extends throughout the length of the plate 54, and, hence, separates the reference surface 62 into two spaced apart film margin support members 63 and 64.

Figure 4:
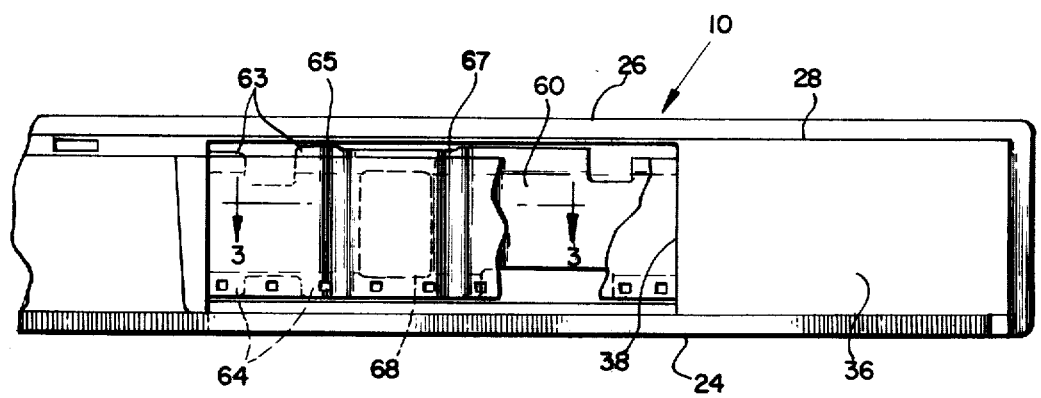
FIG. 4 is a plan view of the cassette edge wall with the film strip cut away so as to further illustrate the cassette and its pressure plate.

Completing the description of the pressure plate 54, it should be noted that an aperture 68, which extends through the plate, provides an opening for transmitting projection illumination through the plate and the overlying film during projection operations as later explained in detail. As can be seen more clearly in FIG. 2, the reference surface 62 and the channel 60 of the pressure plate 54 include curved or concave indents 65 and 67 located at the leading and trailing edges respectively of the aperture 68 when considered in relation to the movement of the film strip 48 during exposure; which direction is from spool 44 toward spool 46 and is shown by the arrow in FIG. 2. Each of the indents 65 and 67 extends laterally across the pressure plate 54 so as to cooperate with the aperture plate 22 as later explained to laterally bend the film strip 48 just prior to its entering and after its leaving the aperture. A plurality of openings or side cutouts 56 are also provided to accept the film side guides and the claw (not shown) when the cassette is mounted in the camera. The plate 54 is held within the cassette 10, by portions (not shown) of the latter which cooperate with offsets 55 at each end of the plate. Lateral movement of the plate 54 is limited by the cassette walls 24 and 26 as shown in FIG. 4, and a spring member (not shown) of the cassette urges the pressure plate 54 towards the opening 38 so as to provide proper contact between the pressure plate and the aperture plate 22, when the cassette is mounted in the camera.

As can be seen in FIG. 2, the aperture plate 22 includes a base portion 69 from which a film engaging portion 70 and cassette guide portion 71 extend. In similar manner, to the pressure plate, the film engaging portion 70 provides a film reference surface 78 through which a longitudinal channel or elongated recess 76 is formed. Hence, the surface 78 is, in effect, cut to provide laterally spaced film support surfaces designated 77 and 79 which can contact the film margins. Rising from the support surface 78 are a pair of spacer members or lands 72 and 74 which are desinged to bracket the film strip 48 and engage pressure plate 54. More particularly, the spacer members 72 and 74 engage the laterally spaced surfaces 63 and 64 of the pressure plate 54 so as to thereby provide a controlled gap or slot (not shown) for the margins of the film during camera operations.

Hence, the spacer members 72 and 74 extend above the film reference surface 78 of plate 22 to a height slightly exceeding the overall thickness of the film strip 48 so as to provide a gap adjoining the film margins which loosely confines, or, that is, provides a loose fit for the film margins and thereby limits movement of the margins perpendicularly toward or away from the plates 22 and 54. Hence, the film reference surfaces 78 and 62 of both plates 22 and 54 together provide means for loosely retaining the film margins in a predetermined plane parallel to the camera or aperture plate reference surface 78.

Figure 3:
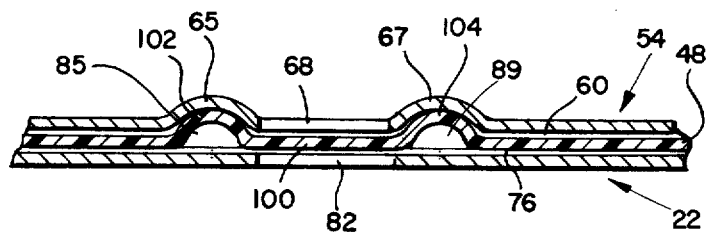
FIG. 3 is a view in section taken longitudinally through the center of the aperture plate and the pressure plate so as to illustrate the operating condition of the film when the cassette of FIG. 1 is operatively located within the camera of FIG. 1.

Continuing with the description of the aperture plate 22, it can be seen that carried within the aperture plate is an aperture 82 which is intended to frame the image carrying rays transmitted rearwardly through the camera lens system 20. Positioned respectively at the leading and trailing edges of this aperture 82 are pairs of film support pads 84, 85, 86 and 87 which are generally complementary to the pressure plate recesses 65 and 67. These pads 84, 85, 86 and 87 extend above the surface 78 to contact the film margins and, as later explained in detail with respect to FIG. 3, are convexly shaped around an axis normal to the longitudinal axis of the plate 22 so as to laterally bend or bow the film just before and after the aperture so as to stress the film segment over the aperture into a flat configuration where it held a precise focal plane without contact to the centrally located image recording area of the film emulsion. Hence, the bumps 84, 85, 86 and 87 cooperate with the indents 65 and 67 and the surfaces 63 and 64 of the plate 54 to force the image segment into a precise focal plane.

Completing the description of the aperture plate 22, it should be noted that an opening 91 is provided in the reference surface 78 to permit operation of a claw (not shown). Fixedly positioned along one side of the aperture plate 22 are a pair of side guides 90 and 92 which cooperate with a pair of movable side guides 94 and 96 of the camera 12 to laterally position both the film strip and the pressure plate 24. The side guides 94 and 96 extend through the aperture plate 22 and are spring biased by means (not shown) towards the fixed side guides 90 and 92.

Referring now to FIG. 3 wherein the apteture portion of the aperture plate 22 and the pressure plate 54 are shown in section (taken longitudinally through the plate apertures) along with the interposed film strip, when all are in an operational position, it can be seen that the bump pairs 84, 85, 86 and 87, in cooperation with the pressure plate indents and the margin support surfaces 77 and 78 of the plate 22 and surface 62 of the plate 22 force the film strip 48 through a tortuous path which transversely bends the film at 102 and 104 as it enters and leaves the aperture 82 which stresses the film segment 100, interposed between the bends 102 and 104, coplanar with the film margins and hence into a precise focal plane without contact to the usable portions of the emulsion. That is, the raised pads or bumps 84, 85, 86 and 87 extend above the reference surface or margin support surface 78 of the aperture plate 22 and force the film into the curved indents 65 and 67 of the pressure plate 54 so as to bend the film. Stated otherwise, as the cassette 10 is seated in proper position on the aperture plate 22, the forwardmost portions of the pressure plate 52, namely the laterally spaced surfaces 63 and 64, which are in engagement with the longitudinal margins 53 and 55 of the film strip 48, force the margins downwardly over the aperture plate bumps. This, in turn, laterally bends both the margins and the intermediate portion of the film strip at opposite edges of the aperture 82, and, hence, essentially prevents the film strip from longitudinally bowing in the area of the film segment, designated at 100, located between the lateral bends. Hence, the film segment 100 is forced into a coplanar configuration such that its intermediate portion is coplanar with its margins and held in the focus plane designated by the margins without contact to the film emulsion in the medial portion of the film strip.

It should be noted that the indents 65 and 67 of the pressure plate 54 extend across the full width of the plate and are of larger diameter in the channel area so that the intermediate portion of the emulsion surface will not contact the pressure plate when the film is laterally bent as indicated. If the channel 60 is sufficiently deep (greater than the height of the lateral bends of the film), the indents 65 and 67 need only occur on the plate reference surface 62 so as to only contact the film margins. This clearance to the emulsion (which also accommodates the later applied processing fluid) may also be achieved with a shallow channel by apertures (not shown) rather than large indents located in the channel 60 so as to provide clearance for the bent film. In any of these arrangements, only the margin indents would operate to contact the film so as to limit the height of the lateral bend.

The aperture plate pads or bumps may extend laterally across the full width of the aperture plate 22 since these would only contact the non-emulsion side of the film, however, since the latter would increase the drag forces on the film, the margin contacting pads are preferred.

Advantageously, since the flat film stress is achieved by laterally bending the film strip as it enters and leaves the focal plae, it should be understood that suitable operation may be achieved by merely deflecting the film just before and just after it leaves the focal plane, for example, by locating the focal plane, or, that is, the margin locating surfaces which determine the focal plane, in a different plane than other portions of the margin locating surfaces so that the film margins would be maintained in a first plane forwardly of the aperture, then deflected into the film plane and back to the first plane as the film passes rearwardly of the aperture.

In the illustrated embodiment, the apparatus for operating the cassette is shown and described as a camera, however, it should be understood that the described film stress arrangement is applicable to other operations than exposure, and, hence, a similar aperture plate structure can be utilized in a projector apparatus.

Those familar with the motion-picture arts will readily appreciate the novel and highly unique advantages of this photographic system which facilitates seating of the film strip in a precise focal plane without contacting the usable emulsion and while providing clearance to the latter for subsequent processing operations. The novel structure provides precise support of the film in the focal plane at the exposure aperture while minimizing film drag which is particularly important in battery operated devices such as hand held cameras.

This invention may be practiced or embodied in still other ways without departng from the spirit or essential character thereof. The preferred embodiments described herein are thereof illustrative and not restrictive, the scope of the invention being indicated by the appended claims and all variations which come within the meaning of the claims are intended to be embraced therein.

What is claimed is:

1. Photographic apparatus for use with a film handling cassette having a housing configured for retaining a strip of photographic film, such cassette housing including an opening in an edge wall thereof configured to present a length of such film strip including an incremental section thereof for photographic operations, a pressure plate located in said cassette housing behind such length of such film strip so as to urge the latter into engagement with an aperture plate of other apparatus, such pressure plate including a pair of laterally spaced members providing contact solely with the margins of the inner surface of such film strip and defining a channel located in parallel relation to the longitudinal axis of such film, each of such spaced members of such pressure plate including a pair of indents longitudinally spaced on each respective member so as to respectively provide an indent therein located at either end of such incremental section, said apparatus comprising:
a housing;
means for receiving such film cassette in an operative location in said housing; and
an aperture plate located in operative location to said receiving means, said aperture plate including means for cooperating with such pressure plate to support at least the margins of such incremental section of such film strip in a predetermined focal plane and for deflecting a portion of such film strip adjacent such incremental section so as to stress such incremental section into a planar configuration while preventing contact of the film portion intermediate its margins with such channel or other portions of such pressure plate, said aperture plate including a pair of laterally spaced longitudinally extended film support members each having a film engaging surface configured for contacting and supporting the margins of such film, an aperture located between said film support members, each of said support members including a pair of pads longitudinally spaced so as to respectively provide one pad located at either end of said aperture, said pads each extending slightly from said film engaging surfaces of said support members and configured to urge the margins of such film strip into such indents so as to thereby transversely bend the portion of such film strip adjoining said aperture.

2. The apparatus of claim 1 wherein said aperture plate includes means for spacing such pressure plate from said aperture plate so as to provide a gap between juxtaposed members of said aperture plate and such pressure plate and to loosely confine the margins of such film strip in such bent configuration overlying said pads.

3. The apparatus of claim 1 wherein said pads are convexly curved around an axis normal to the longitudinal axis of said aperture plate.

4. Photographic apparatus for use with a film handling cassette having a housing configured for retaining a strip of photographic film, such cassette housing including an opening in an edge wall thereof configured to present a length of such film including an incremental section thereof for photographic operations, a pressure plate located in said cassette housing behind such length so as to urge the latter into engagement with an aperture plate of other apparatus, such pressure plate including a pair of laterally spaced members providing contact solely with the margins of the inner surface of such film strip and defining a channel located in parallel relation to the longitudinal axis of such film, each of such spaced members of such pressure plate including a pair of indents longitudinally spaced on each respective member so as to respectively provide an indent therein located at either end of such incremental section, said apparatus comprising:
a housing;
means for receiving such film cassette in an operative location in said housing; and
an aperture plate located in operative relation to said recieving means, said aperture plate including means for cooperating with such pressure plate t support at least the margins of such increm  section of such film strip in a predetermined  plane and for deflecting a portion of such film  adjacent such incremental section so as to stress such incremental section into a planar configuration while preventing contact of the film portion intermediate the margins with such channel or other portions of such pressure plate, said aperture plate including at least a pair of longitudinally spaced bumps extending from the film engaging surface of the aperture plate and providing at least one bump located at both the leading and trailing ends of said aperture, said bumps being spaced equal to the longitudinal spacing of such indents and configured to deflect at least the margins of such film strip into such indents so as to transversely bend such film strip at the leading and trailing ends of said aperture so as to stress the film strip therebetween into a substantially flat configuration in the focal plane wherein the incremental section is coplanar with the adjoining film margins.

5. A photographic system for use with a photographic film strip having an emulsion layer on one side thereof configured for recording images in a usable portion intermediate the margins of the film strip, said system comprising:

an apparatus housing;

means for advancing the film strip along a given film path;

means for providing a photographic operation with progressive incremental sections of the film strip as each incremental section is progressively advanced to a predetermined position in a predetermined focal plane; and means for locating each progressive incremental section in said focal plane as the film strip is advanced along said given path, said locating means including a pair of plates positioned on opposite sides of the film strip and configured for supporting only the longitudinal margins of the one side and at least the longitudinal margins of the other side of the film strip and means for transversely bending the film strip both as it enters and leaves said predetermined position so as to stress the incremental section of the film strip into coplanar relation with the adjoining film margins and into said focal plane without contacting the emulsion layer of the intermediate portion, each of said plates including a pair of laterally spaced members providing contact solely with the margins of said film strip so as to define in each plate a channel aligned with the longitudinal axis of the film strip, the members of one of said plates each including a pair of indents longitudinally spaced on each respective member so as to provide an indent thereon located at either end of said predetermined position and the members of the other of said plates each including a pair of pads spaced in correspondance with said indents and configured to urge the margins of such film strip into such indents so as to thereby transversely bend the film strip as it enters and leaves said predetermined position.

6. A film handling cassette for use with other photographic apparatus which includes means for cooperating with said cassette to advance the cassette contained film strip in a given direction across an elongated aperture plate of the apparatus so as to advance the film strip from a leading to trailing end of an aperture therein and present progressive incremental sections of the film strip at the aperture, and means for providing a photographic program with the progressive incremental sections, the aperture plate including a film margin engaging surfaces configured for defining a predetermined focal plane and for supporting the margins of a length of the film strip in the focal plane, and the aperture plate including at least a pair of longitudinally spaced pads providing at least one pad located at both the leading and trailing end of the aperture so as to deflect portions of the margins of the film strip away from the margin engaging surfaces, said cassette comprising:

a housing configured for retaining an elongated strip of photographic material having an emulsion layer on one side thereof, said housing including a pair of opposed side walls joined together by at least one edge wall;

an opening in said edge wall configured for progressively presenting a length of the film strip responsive to advancement thereof by the other apparatus; and means for guiding the film strip across said opening with the one side of the film strip facing toward the interior of said housing, said guiding means including an elongated pressure plate mounted within said housing interiorly of the film strip at said opening and means for urging said pressure plate towards said opening so as to support at least portions of the length of film strip presented thereat, said pressure plate including a pair of laterally spaced members defining a longitudinal channel in said pressure plate and providing spaced margin engaging surfaces configured for contacting and supporting the margins of the one side of the film strip, each of said spaced members including a pair of indents longitudinally spaced on each member in accordance with the spacing of the aperture plate pads and configured for cooperating with said pads to transversely bend the film strip just before the leading end and just after the trailing end of the aperture so as to stress the film strip therebetween into a substantially flat configuration in the focal plane wherein the incremental section is coplanar with the adjoining film margins.

* * * * *